Figure 1:
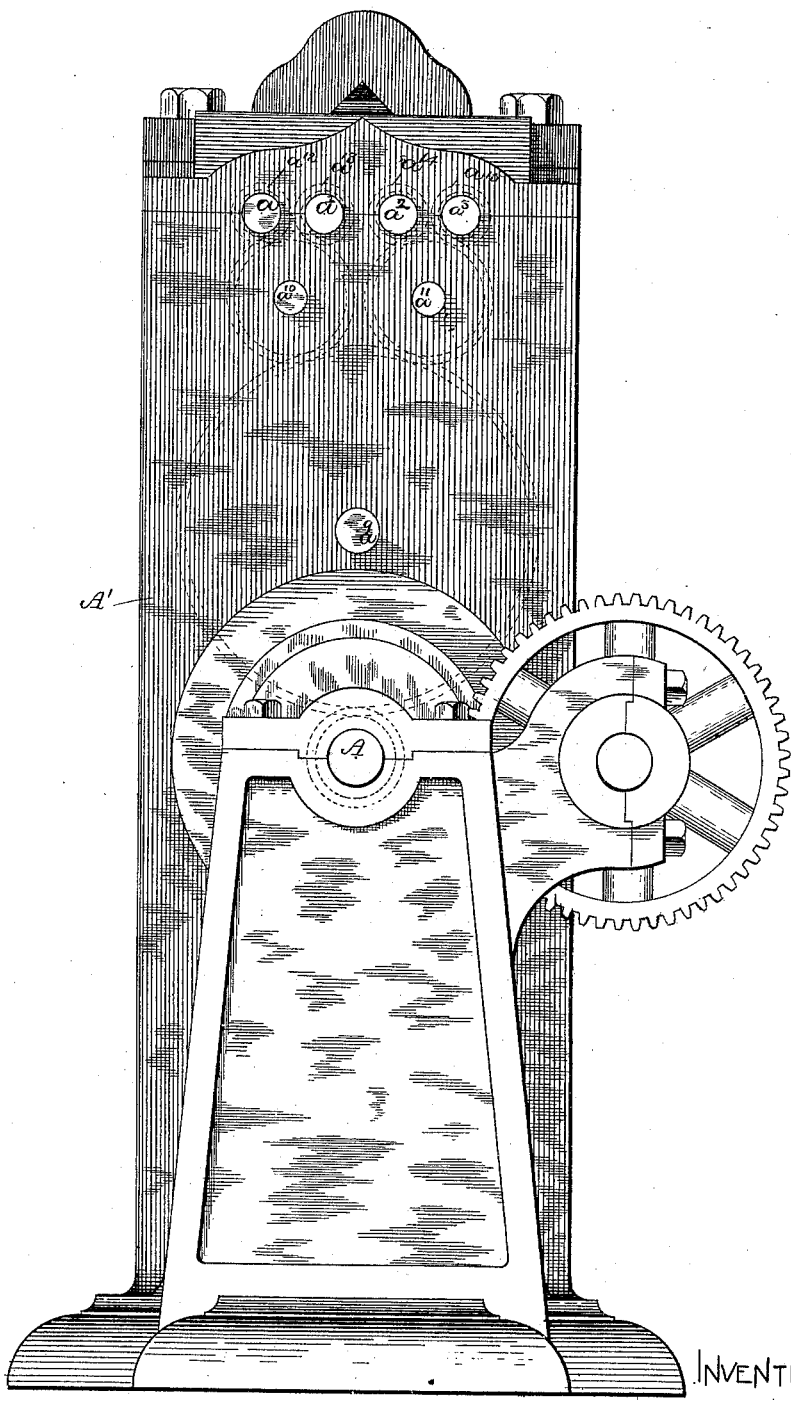

(No Model.)  C. H. TRASK.  6 Sheets—Sheet 1.
MILLING MACHINE.

No. 422,663.  Patented Mar. 4, 1890.

(No Model.)  6 Sheets—Sheet 2.

C. H. TRASK.
MILLING MACHINE.

No. 422,663.  Patented Mar. 4, 1890.

WITNESSES.
INVENTOR.

(No Model.) 6 Sheets—Sheet 3.

C. H. TRASK.
MILLING MACHINE.

No. 422,663. Patented Mar. 4, 1890.

WITNESSES
K. M. Dolan
J. T. Ball

INVENTOR
Chas. H. Trask
by his attys
Clarke & Raymond (No Model.) 6 Sheets—Sheet 5.

C. H. TRASK.
MILLING MACHINE.

No. 422,663. Patented Mar. 4, 1890.

WITNESSES.
J. M. Dolan
J. T. Ball

INVENTOR.
Chas. H. Trask
by his atty.
Charles S. Seymour (No Model.) 6 Sheets—Sheet 6.

C. H. TRASK.
MILLING MACHINE.

No. 422,663. Patented Mar. 4, 1890.

WITNESSES.
J. M. Dolan
J. T. Ball

INVENTOR.
Chas. H. Trask
by his attys
Charles & Raymond

UNITED STATES PATENT OFFICE.

CHARLES H. TRASK, OF LYNN, MASSACHUSETTS, ASSIGNOR TO THE TRASK MILLING MACHINE COMPANY, OF PORTLAND, MAINE.

MILLING-MACHINE.

SPECIFICATION forming part of Letters Patent No. 422,663, dated March 4, 1890.

Application filed July 11, 1889. Serial No. 317,217. (No model.)

*To all whom it may concern:*

Be it known that I, CHARLES H. TRASK, a citizen of the United States, residing at Lynn, in the county of Essex and State of Massachusetts, have invented a new and useful Improvement in Milling-Machines, of which the following is a full, clear, and exact description, reference being had to the accompanying drawings, forming a part of this specification, in explaining its nature.

The invention relates to a milling-machine organized to simultaneously and automatically form the "back-off," so called, of a number of rotary tools or cutters; and it is represented as embraced in an organization consisting of a number of milling tools or cutters arranged upon parallel shafts, and a number of arbors mounted below the shafts carrying the milling-tools, upon which the tools or cutters to be shaped by the milling-tools are mounted in gangs, and which arbors are caused to be rotated and are supported to provide them with a movement toward and from the milling tools or cutters at predetermined intervals and at any desired speed in relation to the degree of their rotation and with any desired extent of movement in relation to said milling-tools by means of the suitable operating devices hereinafter specified.

The invention further relates to the means of adjusting the arbors and the mechanism for operating the same as above indicated, whereby the variation in the speed of their rotation, in the time of their movement in relation to the milling-tools, and in the extent of such movement, is varied.

It will be understood of course that after the adjusting devices have been set to cause the arbors to rotate and move as required the operation of the machine is automatic—that is, the blocks or disks mounted upon the arbors are subjected simultaneously to the action of the milling-tools, whereby one tooth in each block or disk is backed off by the simultaneous advance of all to the milling cutters or tools and their rotation in relation to said milling cutters or tools. The said blocks or disks are then dropped automatically and advanced again for the purpose of backing off the second tooth in order, and these movements continue until the teeth of each block or disk have been backed off.

Figure 2:
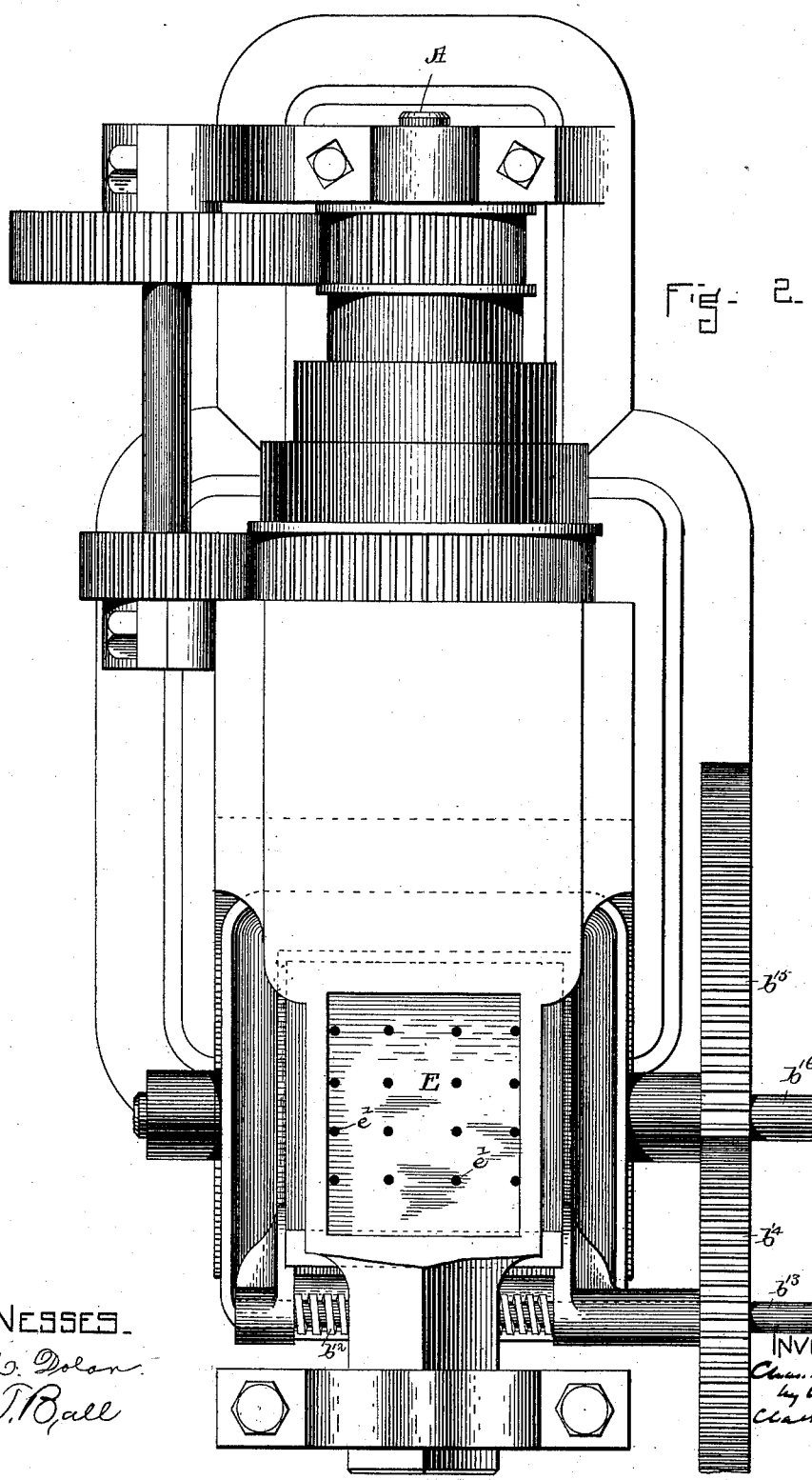
Figure 3:
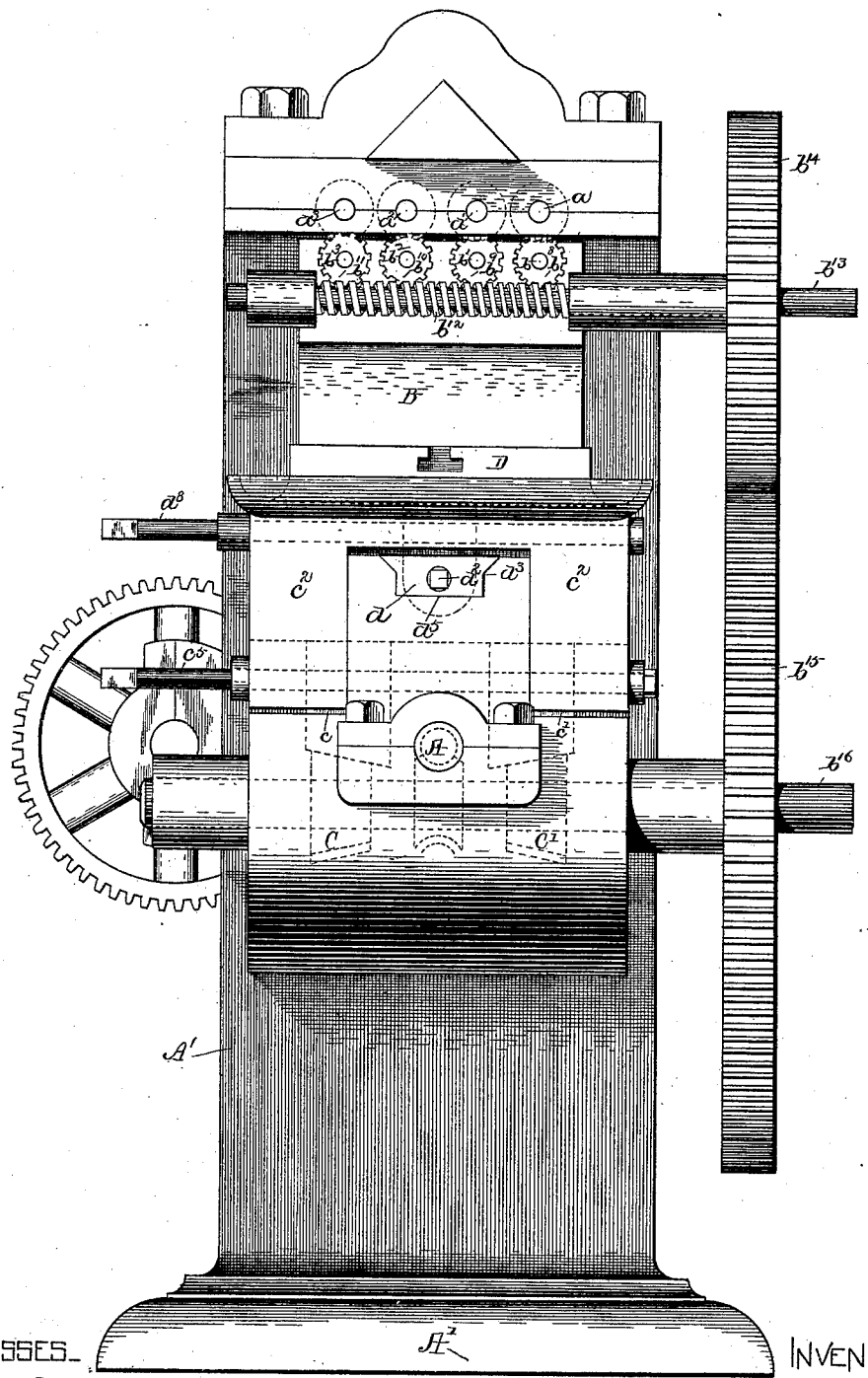
Figure 4:
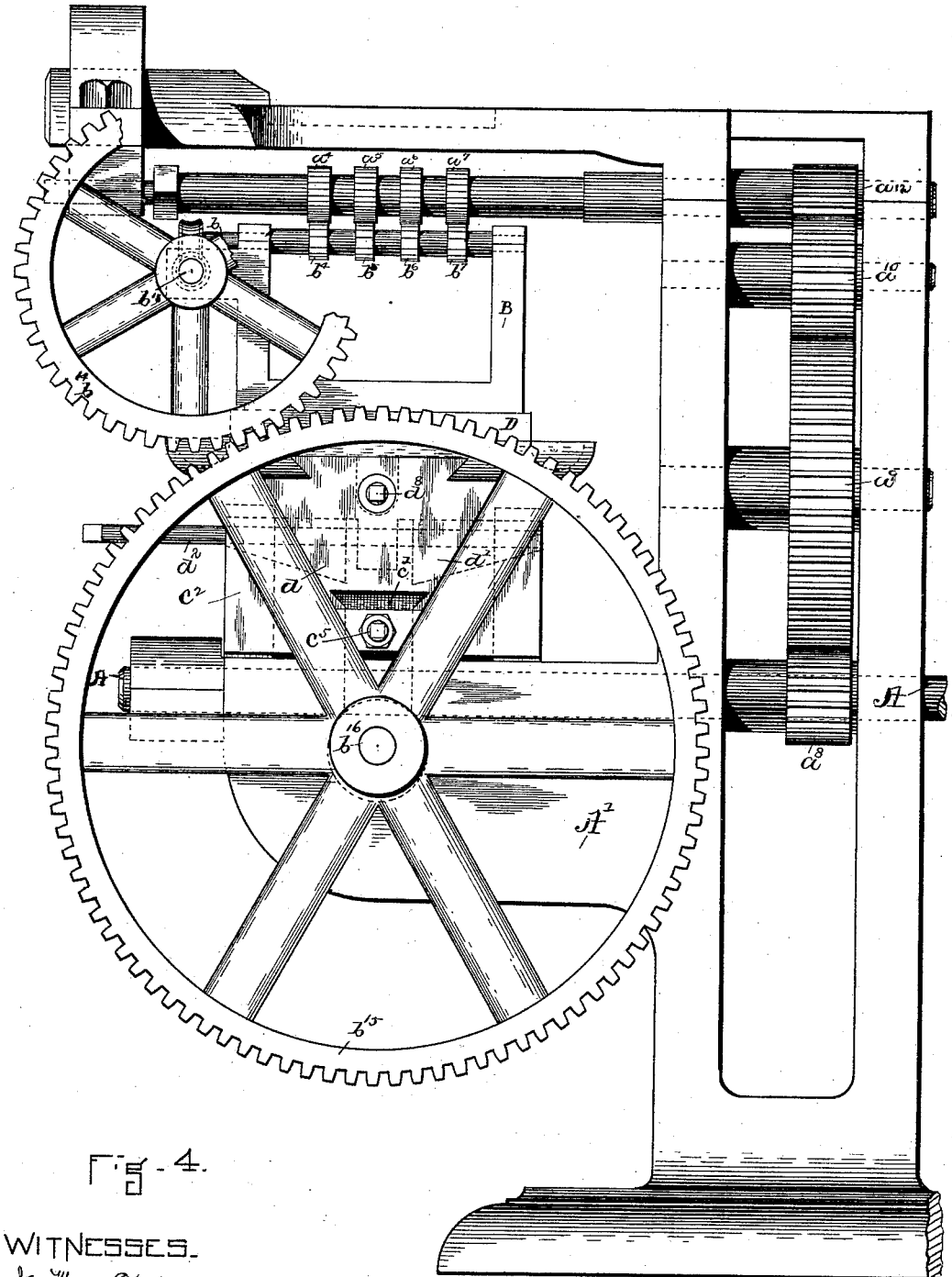
Figure 5:
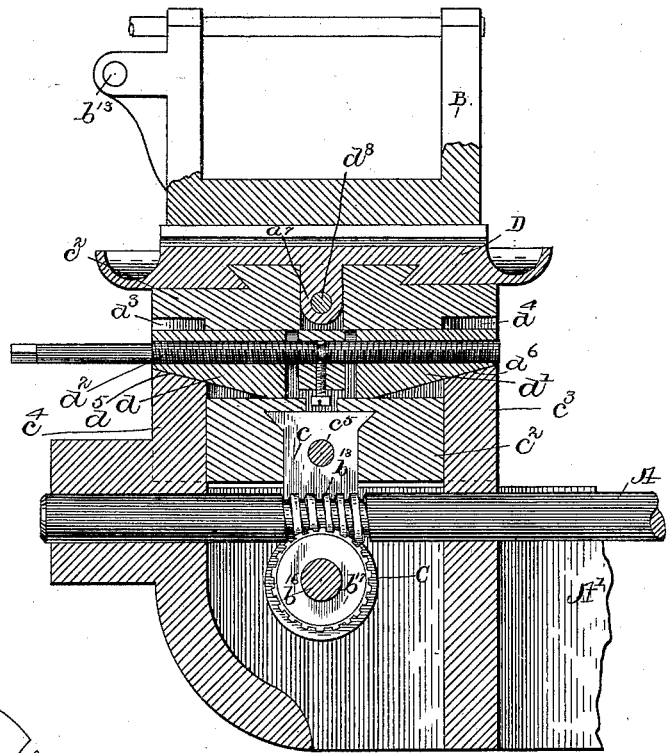
Figure 10:
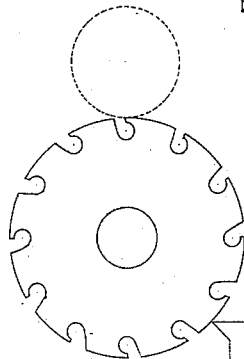
Figure 6:
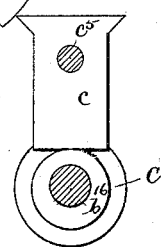
Figure 11:
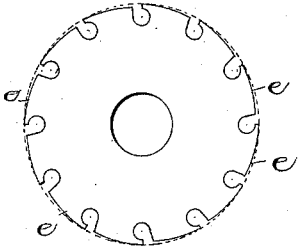
Figure 7:
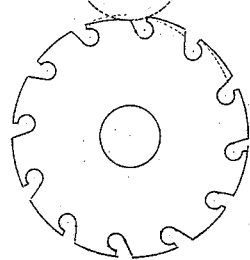
Figure 8:
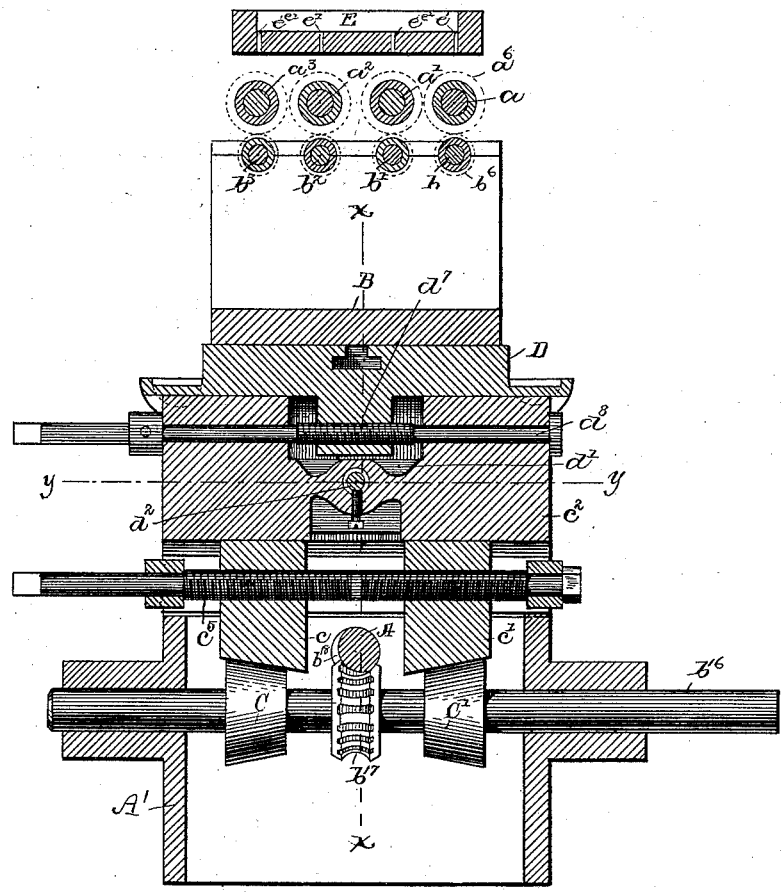
Figure 7:
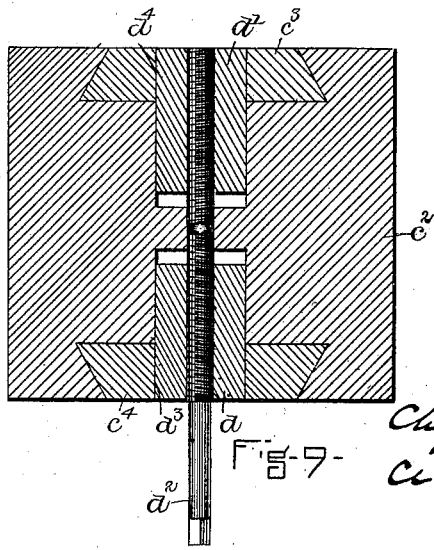

In the drawings, Figure 1 is a view in rear elevation of a machine having the features of my invention. Fig. 2 is a view in plan. Fig. 3 is a view in side elevation. Fig. 4 is a view principally in side elevation. Fig. 5 is a view partly in vertical section upon the line $xx$ of Fig. 8. Fig. 6 is a detail view representing the construction of an operating-cam hereinafter referred to. Fig. 7 is a view of a completed cutter. Fig. 8 is a view in section at a right angle to that represented in Fig. 5. Fig. 9 is a horizontal section upon the dotted line $yy$ of Fig. 8. Fig. 10 is a view representing the relation which the milling-tools bear to the tool-blanks at the beginning of their operation, and Fig. 11 is a view representing the relation which they bear to each other at the end of each operation of the milling-tools.

A is the main shaft of the milling-machine. It is mounted in suitable bearings in the frame A', and it is connected with the four shafts $a\ a'\ a^2\ a^3$, (see Fig. 1,) upon each of which is mounted the milling-tools $a^4\ a^5\ a^6\ a^7$ (see Fig. 4) by means of the pinion $a^8$, (see Figs. 1 and 4,) large intermediate gear $a^9$, smaller gears $a^{10}\ a^{11}$, the first of which meshes with pinions $a^{12}\ a^{13}$ upon shafts $a\ a'$, respectively, and the second of which meshes with pinions $a^{14}\ a^{15}$ upon shafts $a^2\ a^3$, respectively. (See Fig. 1.) These shafts $a\ a'\ a^2\ a^3$ have suitable bearings in the head of the machine. Below the shafts $a\ a'\ a^2\ a^3$ there is an arbor box or frame B, (see Figs. 3, 4, and 5,) which supports the arbors $b\ b'\ b^2\ b^3$. (See Fig. 8.) Each of these arbors supports or carries four tool-blanks to be operated upon $b^4\ b^5\ b^6\ b^7$, (see Fig. 4,) there being a tool-blank for each of the various groups of milling-tools $a^4\ a^5\ a^6\ a^7$. Each arbor has at one end a worm-wheel, the arbor $b$ having the worm-wheel $b^8$, the arbor $b'$ the worm-wheel $b^9$, the arbor $b^2$ the worm-wheel $b^{10}$, the arbor $b^3$ the worm-wheel $b^{11}$, and each of these worm-wheels is engaged by the long worm $b^{12}$, (see Fig. 3,) which is formed upon the shaft $b^{13}$, having suitable bearings in the arbor box or frame B, and is rotated by means of the gear $b^{14}$ upon the shaft $b^{13}$ and the gear $b^{15}$ upon the shaft $b^{16}$. (See Figs. 3 and 4.) The shaft $b^{16}$ has suitable bearings in the frame A' of the machine and has a worm-wheel $b^{17}$, (see Figs. 5 and 8,) which is engaged by the worm $b^{18}$ upon the shaft A. The shaft A is the one upon which the pinion $a^8$, driving the milling-tool shafts $a\ a'\ a^2\ a^3$, is mounted. The shaft $b^{16}$ also carries the cams C C'. (See Figs. 3 and 8.) These cams are shaped or constructed substantially as represented in Figs. 6 and 8, and they serve to communicate vertical movement to the arbor-frame B, arbors carried thereby, and the tool-blanks. This movement is imparted to the arbor-frame B, &c., through the slide-arms $c\ c'$, the lower ends of which bear upon the cams C C', respectively, and which extend downward from a table $c^2$. (See Fig. 8.) This table moves in the dovetail guide-sections $c^3\ c^4$ on the frame A'. (See Fig. 9.) The slide-arms $c\ c'$ not only bear on the cam and impart vertical movement to the table $c^2$, but they are secured or attached to the table by a horizontal dovetail construction, (see Figs. 4 and 8,) which permits them to be moved toward and from each other by means of the right and left screw-threaded shaft $c^5$, the right threaded section of the shaft extending into the threaded hole of one slide-arm and the left threaded section of the shaft into a threaded hole of the other slide-arm. This movement is given the slide-arms $c\ c'$ for the purpose of adjusting the time of the elevation of the table $c^2$ and the arbor-support B. Of course this movement of the slide-arms toward and from each other would not effect this vertical adjustment unless the arms were shaped upon their lower ends, as represented in Fig. 8, to any desired angle or inclination to a horizontal line and the cams were also provided with an inclined surface of a similar angle, whereby upon the movement of the slides upon the cam-surfaces toward each other the table $c^2$ is lowered and away from each other the table is elevated. The table $c^2$ has provision for changing the elevation of the bed D, upon which the arbor frame or support B rests. This is effected by means of the wedge-adjusting blocks $d\ d'$ (see Fig. 5) and the right and left threaded screw-shaft $d^2$, which actuates the wedge-blocks $d\ d'$ to move them toward or from each other. These wedge-blocks extend into wedge-guiding recesses $d^3\ d^4$ in the tops of the dovetail projections $c^3\ c^4$, extending upward from the frame A' (see Figs. 3 and 5) and bear upon the inclined bottoms $d^5\ d^6$ of said recesses. The table $c^2$ also carries a threaded shaft $d^8$, which passes through a nut formed in the section $d^7$ of the bed D, by means of which the bed D and the arbor-support are moved horizontally in relation to the bed $c^2$. (See Fig. 8.) The arbor support or frame B is secured to the bed D in any of the well-known ways. These adjustments—namely, the vertical adjustment and the horizontal adjustment—are provided for the purpose of bringing the work—namely, the tool-blanks $b^4\ b^5\ b^6\ b^7$—into proper relation to the milling-tools before the machine is started, and also for the purpose of providing means whereby tool-blanks varying in size or diameter may be operated upon. After the proper adjustments the automatic operation of the machine is practically confined to the rotation of the milling-tool, the rotation of the arbors and tool-blanks carried thereby, and the vertical movement of the tool-blanks in relation to the milling-tools due to the operation of the cams C C'. The tool-blanks, and consequently the arbors and the arbor-frame, are given as many vertical movements in relation to the milling-tools as there are teeth in the tool-blanks to be backed off. For instance, if it were intended to provide each of the four groups of tool-blanks with fifteen teeth, then the tool-blanks would be moved upward and downward fifteen times in relation to the milling-tool, the rotary movement of the tool-blanks continuing, of course, during these movements. To vary the number of vertical movements to each full revolution of the various tool-blank arbors, the gears $b^{14}\ b^{15}$ are changed for others of the necessary size.

It will be observed that each tool-blank is provided with a vertical movement in relation to its shaping milling-tool, and also with a slow rotary movement, the upward vertical movement continuing during the backing off or removing of a section of the edge of the tool-blank and forming upon the edge of the tool-blank a rounded or curved surface which extends from its edge inward tangentially to any desired extent, according to the number of teeth which the tool-blank is to have, and the cams C C' are shaped to cause or permit a quick return or downward movement of the tool-blanks, arbor-supports, &c., upon the completion of the backing off of each tooth; but the slow rotation of the arbors is not stopped. The effect of this operation is to produce upon each tool-blank a series of curved recesses $e$. (See Fig. 7.) The position which the milling-tool bears to the tool-blank at the beginning of the shaping operation is represented in Fig. 10, and at the end, but before the drop or downward movement of the tool-blanks, in Fig. 11.

The vertical adjustment by means of the slide-arms $c\ c'$ is for the purpose of varying the extent of the drop or vertical movement of the arbors and tool-blanks in relation to the milling-tools; the second vertical adjustment, or that obtained by the wedge-blocks $d\ d'$, is for the purpose of enabling tool-blanks varying in diameter to be worked in the same machine. It will be observed that by this mechanism a large number of tool-blanks are simultaneously operated upon, and that the backing off or forming of each tool-blank proceeds automatically and continuously, and that the backed-off tool-blanks are very accurately and cheaply produced.

To lubricate the milling-tools, I have arranged in the frame over the tools a depressed section which forms an oil pan or holder E, which is provided with holes $e'$ over the milling-tools, so that the oil feeds from the reservoir or holder directly upon the tool.

Having thus fully described my invention, I claim and desire to secure by Letters Patent of the United States—

1. The combination, in a milling-machine, of one or more gangs of milling-tools, one or more rotating arbors supporting a gang of tool-blanks and presenting them to the milling-tool, support for the arbor or arbors, and a cam for providing the arbors with vertical movements in relation to the milling tools or cutters, substantially as described.

2. The combination, in a milling-machine, of one or more gangs of milling-tools, one or more rotating arbors supporting a gang of tool-blanks and presenting them to the milling-tool, support for the arbor or arbors, a cam for providing the arbors with vertical movements in relation to the milling tools or cutters, and an adjusting screw or device for moving the arbor-support horizontally in relation to the milling tools or cutters, substantially as described.

3. The combination, in a milling-machine, of one or more gangs of milling-tools, one or more rotating arbors supporting a gang of tool-blanks and presenting them to the milling-tool, support for the arbor or arbors, a cam for providing the arbors with vertical movements in relation to the milling tools or cutters, and vertically-adjustable arms interposed between the clamp and the arbor-support, whereby the time of the action of the cam is varied, substantially as described.

4. The combination, in a milling-machine, of one or more gangs of milling-tools, one or more rotating arbors supporting a gang of tool-blanks and presenting them to the milling-tool, support for the arbor or arbors, a cam for providing the arbors with vertical movements in relation to the milling tools or cutters, and adjusting wedges or devices interposed between the arms or connections bearing immediately upon the cam, and an arbor-support whereby the support is made vertically adjustable without moving the supports or arms which bear on the cam, substantially as described.

5. In a milling-machine having one or more gangs of milling-tools, the oil pan or receptacle E, arranged at the upper portion of said machine over said milling-tools and provided with the oil-holes $e'$, substantially as set forth.

6. The combination of one or more gangs of milling tools or cutters, one or more rotary arbors for supporting a gang of tool-blanks and presenting them to the milling tools or cutters, the arbor-support B, having a horizontal movement and also a vertical movement in relation to the milling-tools, substantially as described.

7. The combination, in a milling-machine, of one or more gangs of milling tools or cutters, one or more rotary arbors for presenting one or more gangs or groups of tool-blanks to the milling-tools, the arbor-support, cams with tapering or cone surfaces for providing it with a vertical movement through interposed supporting mechanism and said mechanism comprising a vertically-movable table having horizontally-movable arms having ends of the same inclination as the cams, a bed carried by the table and movable vertically in relation thereto by adjustable wedges, and the arbor-support mounted upon the bed and horizontally movable thereon by means of an adjusting-screw, substantially as described.

8. The combination, in a milling-machine, of the milling tool or tools, the arbor-support having vertical movements, one or more arbors carried thereby, each of which has at one end a worm-wheel, a worm to engage said worm wheel or wheels, a gear $b^{14}$, mounted upon the worm-shaft, and a positively-actuated gear $b^{15}$ to engage the gear $b^{14}$, substantially as and for the purposes specified.

9. The combination of the pinion $a^8$ upon the shaft A, the gear $a^9$, the gears $a^{10}$ $a^{11}$, the shafts $a$ $a'$ $a^2$ $a^3$, carrying gangs of milling-tools, the cams C C', shaped as specified and mounted upon the shaft $b^{16}$, the worm-wheel $b^{17}$ upon said shaft engaged by a worm on the shaft A, the arbors mounted upon the arbor-support B, their worm-wheels, the worm-shaft $b^{13}$, the worm of which engages said worm-wheels, the gear $b^{14}$ on the worm-shaft, and the gear $b^{15}$ on the cam-shaft $b^{16}$, substantially as described.

CHARLES H. TRASK.

Witnesses:
F. F. RAYMOND, 2d,
J. M. DOLAN.